(12) United States Patent
Yokota et al.

(10) Patent No.: US 11,157,755 B2
(45) Date of Patent: Oct. 26, 2021

(54) IMAGE PROCESSING APPARATUS

(71) Applicants: TOYOTA JIDOSHA KABUSHIKI KAISHA, Toyota (JP); DENSO CORPORATION, Kariya (JP)

(72) Inventors: Masataka Yokota, Tokyo-to (JP); Jia Sun, Tokyo-to (JP); Takahiro Sota, Yokohama (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 22 days.

(21) Appl. No.: 16/514,313

(22) Filed: Jul. 17, 2019

(65) Prior Publication Data
US 2020/0026934 A1    Jan. 23, 2020

(30) Foreign Application Priority Data
Jul. 18, 2018    (JP) .............................. JP2018-135056

(51) Int. Cl.
*G06K 9/00*    (2006.01)
*B60R 11/04*    (2006.01)
(Continued)

(52) U.S. Cl.
CPC .......... *G06K 9/00805* (2013.01); *B60R 11/04* (2013.01); *G06T 5/50* (2013.01);
(Continued)

(58) Field of Classification Search
CPC ............. G06K 9/00771; G06K 9/3233; G06K 9/00805; G06T 7/292; G06T 7/70;
(Continued)

(56) References Cited

U.S. PATENT DOCUMENTS

2014/0028873 A1*    1/2014    Higuchi ............... H04N 5/2352
                                                                348/229.1
2016/0314365 A1*    10/2016    Poledna ................. G06K 9/209

FOREIGN PATENT DOCUMENTS

JP            5-342497 A    12/1993
JP    2017-207907 A    11/2017

OTHER PUBLICATIONS

"Extending the Detection Range of Vision-Based Vehicular Instrumentation" (published in IEEE Transactions on Instrumentation and Measurement, vol. 65, No. 4, pp. 856-873) (Year: 2016).*

* cited by examiner

*Primary Examiner* — Casey L Kretzer
(74) *Attorney, Agent, or Firm* — Sughrue Mion, PLLC

(57) ABSTRACT

An image processing apparatus (12) has a processing device (122) for executing, on a first image (111w) captured by a first imaging device (11w) imaging a first imaging area and a second image (111t) captured by a second imaging device (11t) imaging a second imaging area, an image recognition processing for recognizing a target in the first image and the second image, the processing device executes the image recognition processing on a non-overlapped image part (113w) of the first image without executing it on a overlapped image part (112w) of the first image when the processing device executes the image recognition processing on the first image, the non-overlapped image part includes a non-overlapped area at which the first imaging area does not overlap with the second imaging area, the overlapped image part includes a overlapped area at which the first imaging area overlaps with the second imaging area.

2 Claims, 9 Drawing Sheets

(51) Int. Cl.
  *G06T 7/11* (2017.01)
  *G06T 7/174* (2017.01)
  *G06T 5/50* (2006.01)

(52) U.S. Cl.
  CPC ............... *G06T 7/11* (2017.01); *G06T 7/174* (2017.01); *B60R 2300/105* (2013.01); *B60R 2300/303* (2013.01); *B60R 2300/8093* (2013.01); *G06T 2207/20221* (2013.01); *G06T 2207/30261* (2013.01)

(58) Field of Classification Search
  CPC ............ G06T 2207/30232; G06T 7/11; G06T 7/174; G06T 5/50; G06T 2207/20221; G06T 2207/30261; H04N 5/23238; H04N 7/181; B60R 11/04; B60R 2300/303; B60R 2300/8093; B60R 2300/105
  See application file for complete search history.

IMAGE PROCESSING APPARATUS

TECHNICAL FIELD

The present invention relates to a technical field of an image processing apparatus that is configured to execute an image recognition processing for recognizing a target in an image captured by an imaging device such as a camera, for example.

BACKGROUND ART

A Patent Literature 1 discloses, as one example of an image processing apparatus, an image processing apparatus that is used by a vehicle having a camera and that is configured to recognize a condition of a surrounding vehicle such as a position, a velocity and an acceleration rate on the basis of an information inputted from the camera.

There is a Patent Literature 2 as another document relating to the present invention. The Patent Literature 2 discloses an image processing apparatus that is used by a vehicle having a camera including a wide angle lens and a camera including a telephoto lens and that is configured to execute a predetermined processing on each of two images captured by these two cameras.

CITATION LIST

Patent Literature

[Patent Literature 1] Japanese Unexamined Patent Application Publication No. 2017-207907
[Patent Literature 2] Japanese Unexamined Patent Application Publication No. H05-342497 (1993-342497)

SUMMARY OF INVENTION

Technical Problem

The image processing apparatus disclosed in the Patent Literature 2 execute the predetermined processing on each of two images captured by two cameras, respectively. Thus, if the vehicle disclosed in the Patent Literature 1 has two cameras (alternatively, a plurality of cameras), the processing for recognizing the condition of the surrounding vehicle such as the position, the velocity and the acceleration rate is executed on each of a plurality of images captured by the plurality of cameras, respectively. However, in this case, there is a possibility that a calculation cost (in other words, a calculation load) of the image processing apparatus becomes high (in other words, a calculation amount balloons). Thus, it is desired to reduce the calculation cost (namely, reduce the calculation amount).

There is a method for reducing a resolution of each of images captured by the cameras, respectively, and then recognizing the condition of the surrounding vehicle such as the position, the velocity and the acceleration rate on the basis of the images having the reduced resolutions, as a first method for reducing the calculation cost. There is a method for recognizing the condition of the surrounding vehicle such as the position, the velocity and the acceleration rate on the basis of a relatively small number of images by reducing an imaging rate of each camera (namely, reducing the number of the images captured by each camera per unit time), as a second method for reducing the calculation cost. There is a method for extracting only one portion of the plurality of images captured by each camera with a predetermined imaging rate for a certain period and then recognizing the condition of the surrounding vehicle such as the position, the velocity and the acceleration rate on the basis of a relatively small number of the extracted images, as a third method for reducing the calculation cost. However, each of these methods likely deteriorates an accuracy of recognizing the surrounding vehicle (alternatively, any target) in the image.

The above described technical problem is one example of the technical problem to be solved by the present invention. It is therefore an object of the present invention to provide, for example, an image processing apparatus that is configured to execute an image recognition processing for recognizing a target in an image captured by an imaging device such as a camera and furthermore to achieve a reduction of a calculation cost of the image recognition processing and a prevention of a deterioration of a recognition accuracy of the image recognition processing at the same time.

Solution to Problem

First aspect of an image processing apparatus of the present invention is an image processing apparatus having: a receiving device that is configured to receive a first image obtained by a first imaging device imaging a first imaging area and a second image obtained by a second imaging device imaging a second imaging area, a focal length of the second imaging device being longer than a focal length of the first imaging device, the second imaging area partially overlapping with the first imaging area; and a processing device that is configured to execute, on at least one portion of the first image and the second image, an image recognition processing for recognizing a target in at least one of the first image and the second image, the processing device being configured to execute the image recognition processing on a non-overlapped image part of the first image without executing the image recognition processing on a overlapped image part of the first image when the processing device executes the image recognition processing on the first image, the non-overlapped image part including a non-overlapped area at which the first imaging area does not overlap with the second imaging area, the overlapped image part including a overlapped area at which the first imaging area overlaps with the second imaging area.

Second aspect of an image processing apparatus of the present invention is an image processing apparatus having: a receiving device that is configured to receive a first image obtained by a first imaging device imaging a first imaging area and a second image obtained by a second imaging device imaging a second imaging area, a focal length of the second imaging device being longer than a focal length of the first imaging device, the second imaging area partially overlapping with the first imaging area; and a processing device that is configured to execute, on each of the first image and the second image, an image recognition processing for recognizing a target in at least one of the first image and the second image, the processing device being configured to execute the image recognition processing with a first calculation cost on a non-overlapped image part of the first image and to execute the image recognition processing with a second calculation cost that is lower than the first calculation cost on a overlapped image part of the first image when the processing device executes the image recognition processing on the first image, the non-overlapped image part including a non-overlapped area at which the first imaging area does not overlap with the second imaging area, the overlapped image part including a overlapped area at which the first imaging area overlaps with the second imaging area.

Third aspect of an image processing apparatus of the present invention is an image processing apparatus having: a receiving device that is configured to receive a first image obtained by a first imaging device imaging a first imaging area and a second image obtained by a second imaging device imaging a second imaging area, a focal length of the second imaging device being longer than a focal length of the first imaging device, the second imaging area partially overlapping with the first imaging area; and a processing device that is configured to execute, on each of the first image and the second image, an image recognition processing for recognizing a target in at least one of the first image and the second image, the processing device being configured to execute, as the image recognition processing, a first image recognition processing for recognizing the target in a non-overlapped image part of the first image on each of the plurality of first images and to execute, as the image recognition processing, a second image recognition processing for recognizing the target in an overlapped image part of the first image on one portion of the plurality of first images without executing the second image recognition processing on another one portion of the plurality of first images, when the processing device executes the image recognition processing on a plurality of first images, the non-overlapped image part including a non-overlapped area at which the first imaging area does not overlap with the second imaging area, the overlapped image part including a overlapped area at which the first imaging area overlaps with the second imaging area.

DESCRIPTION OF EMBODIMENTS

Hereinafter, with reference to drawings, one embodiment of the image processing apparatus of the present invention will be described. In the following description, a vehicle 1 to which one embodiment of the image processing apparatus of the present invention is adapted will be described.

(1) Structure of Vehicle 1

Figure 1:
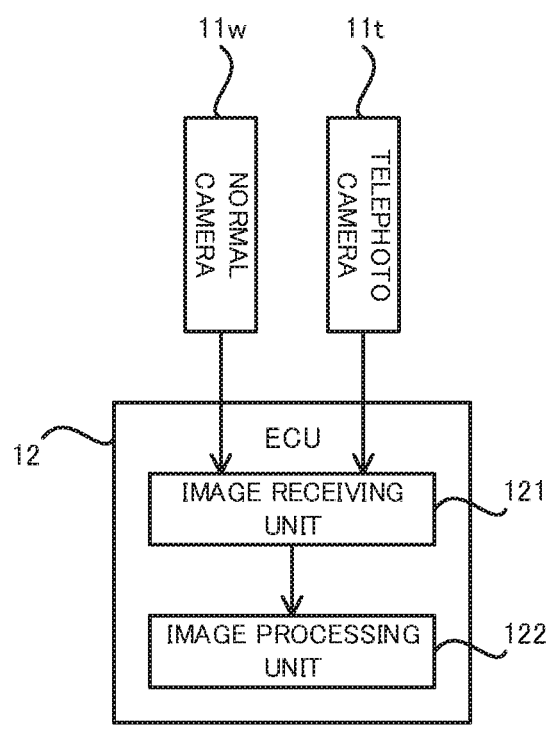
FIG. 1 is a block diagram that illustrates a structure of a vehicle in a present embodiment.
Figure 2A:
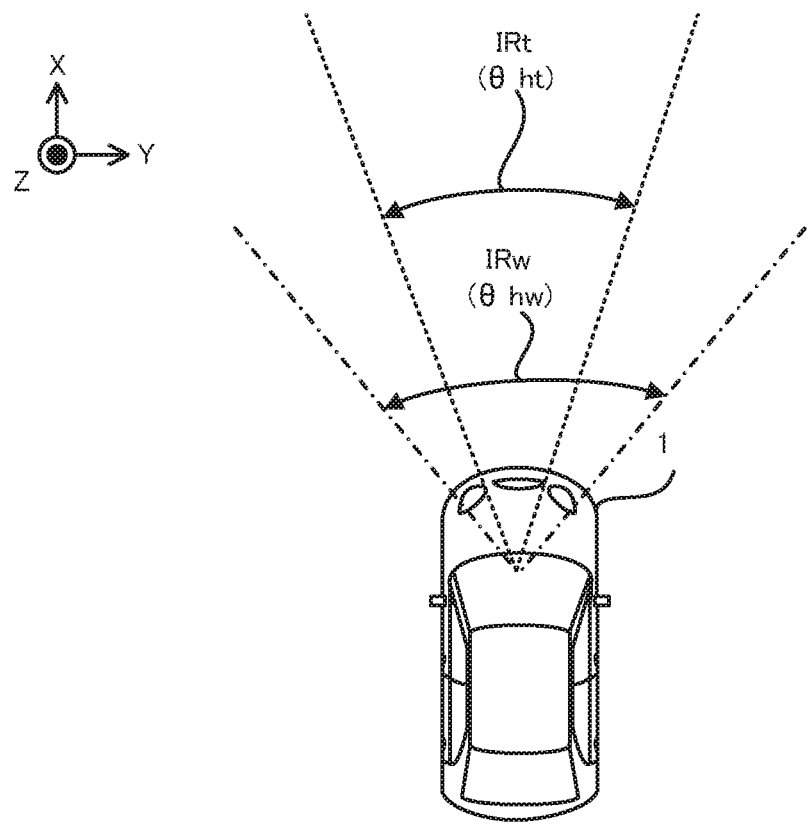
FIG. 2A is a planer view that illustrates an imaging range of a normal camera and an imaging range of a telephoto camera in the vehicle in the present embodiment and FIG. 2B is a cross-sectional view that illustrates the imaging range of the normal camera and the imaging range of the telephoto camera in the vehicle in the present embodiment.

Firstly, with reference to FIG. 1 and FIG. 2A to FIG. 2B, a structure of the vehicle 1 in the present embodiment will be explained. FIG. 1 is a block diagram that illustrates the structure of the vehicle 1 in a present embodiment. FIG. 2A is a planer view that illustrates an imaging range IRw of a normal camera 11w and an imaging range IRt of a telephoto camera 11t in the vehicle 1 in the present embodiment and FIG. 2A is a cross-sectional view that illustrates the imaging range IRw of the normal camera 11w and the imaging range IRt of the telephoto camera 11t in the vehicle 1 in the present embodiment. Incidentally, in the below described description, the embodiment will be described by using an XYZ coordinate system in which rightward from the vehicle 1 corresponds to "toward +Y direction", a leftward from the vehicle 1 corresponds to "toward −Y direction", frontward from the vehicle 1 corresponds to "toward +X direction", backward (rearward) from the vehicle 1 corresponds to "toward −X direction", upward from the vehicle 1 corresponds to "toward +Z direction", and downward from the vehicle 1 corresponds to "toward −Z direction", as necessary.

As illustrated in FIG. 1, the vehicle 1 has: the normal camera 11w that is one example of a "first imaging device" or a "first imager" in a below described additional statement; the telephoto camera 11t that is one example of a "second imaging device" or an "second imager" in the below described additional statement; and an ECU (Electronic Control Unit) 12 that is one example of an "image processing apparatus" or a "controller" in the below described additional statement.

The normal camera 11w is an imaging device having an imaging angle (in other words, an angle of view) that is wider than that of the telephoto camera 11t. Namely, the telephoto camera 11t is an imaging device having the imaging angle that is narrower than that of the normal camera 11w. In other words, the normal camera 11w is the imaging device having a focal length that is shorter than that of the telephoto camera 11t. Namely, the telephoto camera 11t is the imaging device having the focal length that is longer than that of the normal camera 11w. Thus, the term "normal camera 11w" in the present invention means a camera that has the imaging angle that is wider than that of the telephoto camera 11t and has the focal length that is shorter than that of the telephoto camera 11t rather than a camera having a general normal lens (for example, a lens having the imaging angle from 20 degree to 50 degree). Similarly, the term "telephoto camera 11t" in the present invention means a camera that has the imaging angle that is narrower than that of the normal camera 11w and has the focal length that is longer than that of the normal camera 11w rather than a camera having a general telephoto lens (for example, a lens having the imaging angle from 10 degree to 15 degree). Note that FIG. 2A and FIG. 2B illustrate an example in which a horizontal imaging angle θhw of the normal camera 11w is wider than a horizontal imaging angle θht of the telephoto camera 11t and a vertical imaging angle θvw of the normal camera 11w is wider than a vertical imaging angle θvt of the telephoto camera 11t.

Figure 2B:
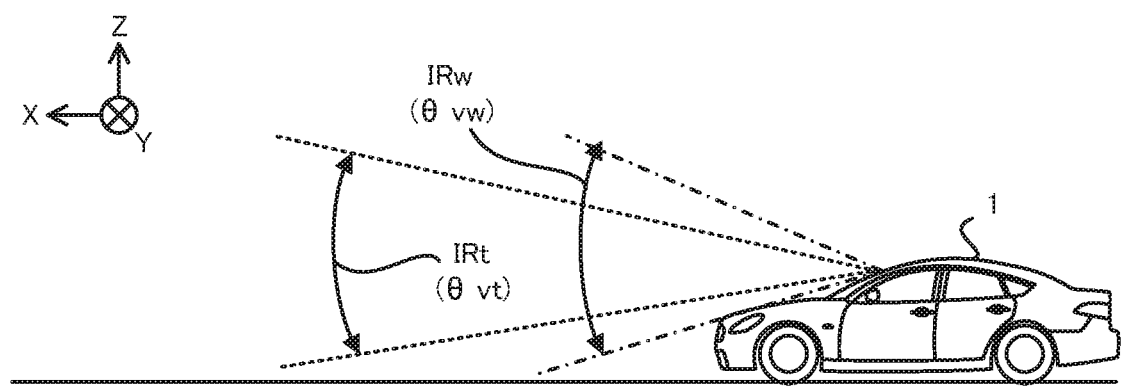

Each of the normal camera 11w and the telephoto camera 11t is fixed to the vehicle 1 to image (in other words, capture an image of) a view on the front (especially, just in from) of the vehicle 1, as illustrated in FIG. 2A and FIG. 2B. Specifically, in order to image the view on the front of the vehicle 1, an imaging center of each of the normal camera 11w and the telephoto camera 11t is just at the front of the vehicle 1. Namely, an optical axis of an optical system such as a lens of each of the normal camera 11w and the telephoto camera 11t extends frontward and straightforwardly from the vehicle 1. Especially, in the present embodiment, the normal camera 11w and the telephoto camera 11t are aligned to each other so that an imaging area (in other words, an imaging range) IRw of the normal camera 11w partially overlaps with an imaging area IRt of the telephoto camera 11t on the front of the vehicle 1. Specifically, the normal camera 11w and the telephoto camera 11t are aligned to each other so that the imaging area IRt of the telephoto camera 11t is included in the imaging area IRw of the normal camera 11w on the front of the vehicle 1. However, a position of each of the normal camera 11w and the telephoto camera 11t is not limited as long as each of the normal camera 11w and the telephoto camera 11t images the view on the front of the vehicle 1 and the imaging area IRw of the normal camera 11w partially overlaps with the imaging area IRt of the telephoto camera 11t.

The ECU 12 is configured to control entire operation of the vehicle 1. Especially in the present embodiment, the ECU 12 is configured to execute an target recognition operation for recognizing a target in at least one portion of an image captured by the normal camera 11w (in the following description, it is referred to as a "normal image 111w") and an image captured by the telephoto camera 11t (in the following description, it is referred to as a "telephoto image 111t"). At least one of another vehicle, a bicycle, a pedestrian, an obstacle, a traffic signal, a road sign and a road mark is one example of the target. Note that the operation for recognizing the target in the present embodiment includes an operation for identifying what type of target the target is (for example, whether the target is another vehicle, the bicycle, the pedestrian, the obstacle, the traffic signal in which a specific color light is turned on, the road sign having a specific meanings or the road mark having a specific meanings). Moreover, the operation for recognizing the target in the present embodiment may include an operation for determining at least one of a position, a moving velocity and a moving direction of the target. In order to execute the target recognition operation, the ECU 12 includes, as processing blocks that are logically realized in the ECU 12, an image receiving unit 121 that is one example of a "receiving device" in the below described additional statement and an image processing unit 122 that is one example of a "processing device" in the below described additional statement. The operation of each of the image receiving unit 121 and the image processing unit 122 will be described later in detail with reference to the drawings.

(2) Flow of Target Recognition Operation

Next, a flow of the target recognition operation executed by the ECU 12 will be described. In the present embodiment, the ECU 12 is configured to execute at least one of a first target recognition operation and a second target recognition operation. Thus, in the following description, the first target recognition operation and the second target recognition will be described in order.

(2-1) Flow of First Target Recognition Operation

Figure 3:
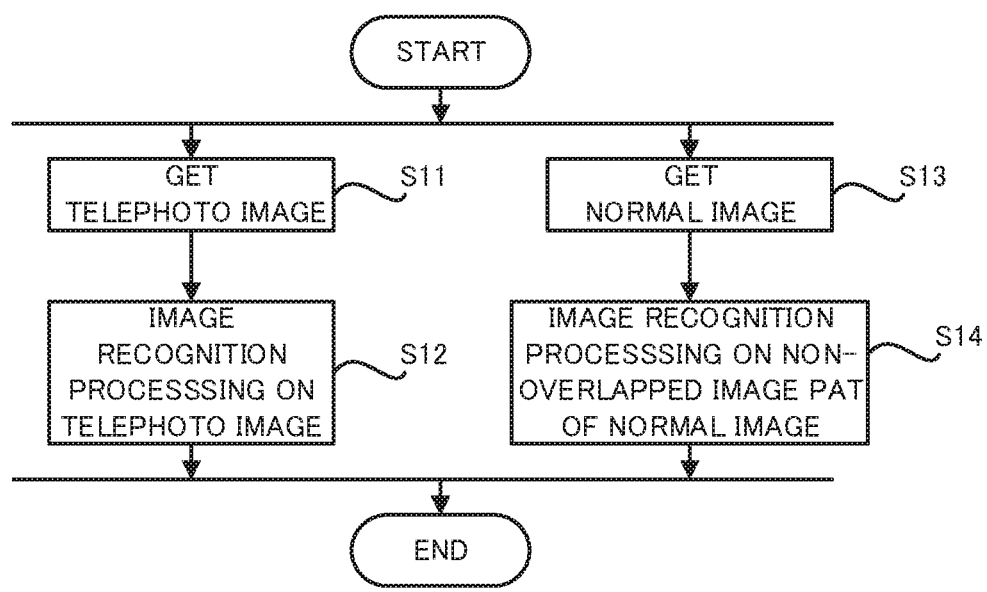
FIG. 3 is a flowchart that illustrates a flow of a first target recognition operation in the present embodiment.

Firstly, with reference to FIG. 3, a flow of the first target recognition operation will be described. FIG. 3 is a flowchart that illustrates the flow of the first target recognition operation.

As illustrated in FIG. 3, firstly, the image receiving device 121 receives the telephoto image 111t from the telephoto camera 11t (a step S11). Moreover, the image receiving device 121 receives the normal image 111w from the normal camera 11w (a step S13)

Note that the normal camera 11w is configured to image the view on the front of the vehicle 1 with a predetermined first imaging rate (for example, an imaging rate with which the view on the front of the vehicle 1 is imaged ten times in a second and ten normal images 111w are received in a second). The telephoto camera 11t is also configured to image the view on the front of the vehicle 1 with a predetermined second imaging rate (for example, an imaging rate with which the view on the front of the vehicle 1 is imaged ten times in a second and ten telephoto images 111t are received in a second). Therefore, the ECU 12 is configured to execute the target recognition operation illustrated in FIG. 3 every time the normal camera 11w and the telephoto camera 11t image the view on the front of the vehicle 1. Namely, the target recognition operation illustrated in FIG. 3 is executed repeatedly depending on the imaging rates of the normal camera 11w and the telephoto camera 11t.

Figure 4:
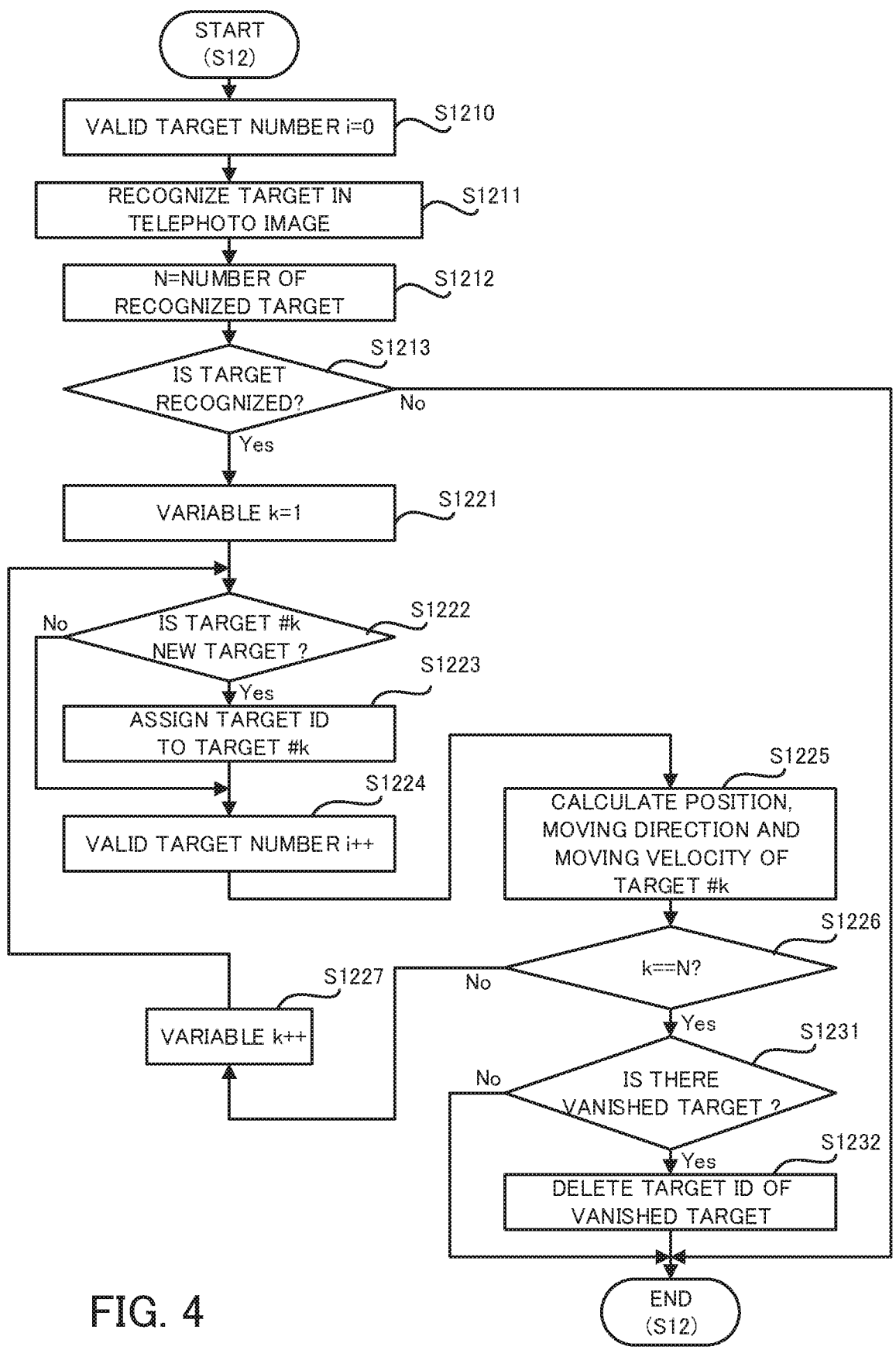
FIG. 4 is a flowchart that illustrates a flow of an image recognition processing at a step S12 in FIG. 3.

Then, the image processing unit 122 executes an image recognition processing for recognizing the target in the telephoto image 111t on the telephoto image 111t (typically, the whole of the telephoto image 111t) (a step S12). Here, with reference to FIG. 4, a flow of the image recognition processing at the step S12 in FIG. 3 will be described. FIG. 4 is a flowchart that illustrates the flow of the image recognition processing at the step S12 in FIG. 3.

As illustrated in FIG. 4, firstly, the image processing unit 122 resets a variable i for representing the number of the targets that are validly recognized to zero (a step S1210). Then, the image processing unit 122 recognizes the target in the telephoto image 111t (a step S1211). Moreover, the image processing unit 122 records, as a variable N, the number of the target recognized at the step S1211 (a step S1212). Note that the image processing unit 122 may use an existing method as a method of recognizing the target in the image. Thus, a detailed description of the method of recognizing the target in the image is omitted. Note that a method of determining what type of the target the target is on the basis of a similarity between a template and the target in the telephoto image 111t (what we call a template matching method) is one example of the existing method. A method of extracting an amount of characteristics around the target in the telephoto image 111t, outputting, on the basis of the extracted amount of characteristics, a probability that the target is each of a plurality of types of the targets and determining what type of the target the target is on the basis of the probability (for example, a method using a neural network).

Then, the image processing unit 122 determines whether or not at least one target is recognized at the step S1211 (a step S1213). As a result of the determination at the step S1213, when it is determined that no target is recognized (namely, the variable N representing the number of the recognized target is zero) (the step S1213: No), the image processing unit 122 terminates the image recognition processing illustrated in FIG. 4. On the other hand, when it is determined that at least one target is recognized (namely, the variable N representing the number of the recognized target is equal to or larger than 1) (the step S1213: No), the image processing unit 122 resets a variable k to 1 (a step S1221).

Then, the image processing unit 122 determines whether or not the k-th target #k among the N (note that N is equal to or more than 1) targets recognized at the step S1212 is a new target that is not yet recognized by the image recognition processing completed last time (namely, the image recognition processing that has been executed on the telephoto image 111t received just before the currently executed image recognition processing) (a step S1222). As a result of the determination at the step S1222, when it is determined that the k-th target #k is the new target (the step S1222: Yes), the image processing unit 122 assigns, to the k-th target #k, a unique target ID used for identifying each target, in order to manage the k-th target #k (a step S1223). On the other hand, as a result of the determination at the step S1222, when it is determined that the k-th target #k is not the new target (namely, the k-th target #k is also included in the telephoto image 111t received just before the currently executed image recognition processing) (the step S1222: No), the image processing unit 122 does not assign the new target ID to the k-th target #k, because the target ID is already assigned to the k-th target #k by the previous image recognition processing.

Then, the image processing unit 122 increments, by 1, the variable i representing the number of the targets that are validly recognized (a step S1224). Then, the image processing unit 122 calculates a position of the k-th target #k in the telephoto image 111t (a step S1225). Moreover, the image processing unit 122 calculates a moving direction and a moving velocity of the k-th target #k by comparing the position of the k-th target #k in the currently received telephoto image 111t and the position of the k-th target #k in the previously received telephoto image 111t (namely, the telephoto image 111t received before the currently executed image recognition processing) (a step S1225). However, when the k-th target #k is the new target, the image processing unit 122 does not necessarily calculate the moving direction and the moving velocity of the k-th target #k.

Then, the image processing unit 122 determines whether or not the variable k is equal to the variable N for representing the number of the target recognized at the step S1211 (a step S1226). Namely, the image processing unit 122 determines whether or not the processing for calculating the position, the moving direction and the moving velocity of the target is executed on all of the target(s) recognized at the step S1211. As a result of the determination at the step S1226, when it is determined that the variable k is not equal to the variable N for representing the number of the target recognized at the step S1211 (the step S1226: No), it is considered that the processing for calculating the position, the moving direction and the moving velocity of the target is not yet executed on one portion of the targets recognized at the step S1211. In this case, the image processing unit 122 increments the variable k by 1 (a step S1227) and then repeats the processing from the step S1222.

On the other hand, as a result of the determination at the step S1226, when it is determined that the variable k is equal to the variable N for representing the number of the target recognized at the step S1211 (the step S1226: Yes), it is considered that the processing for calculating the position, the moving direction and the moving velocity of the target is already executed on all of the target(s) recognized at the step S1211. In this case, the image processing unit 122 determines whether or not the target(s) recognized in the previously received telephoto image 111t include(s) the target that is not recognized in the currently received telephoto image 111t (a step S1231). Namely, the image processing unit 122 determines whether or not there is the target vanished from the currently received telephoto image 111t (namely, the target recognized in the previously received telephoto image 111t vanishes from the currently received telephoto image 111t) (the step S1231). As a result of the determination at the step S1231, when it is determined that there is the vanished target (the step S1231: Yes), the image processing unit 122 deletes the target ID assigned to the vanished target, because it is no need to manage the vanished target (a Step S1232). Then, the image processing unit 122 terminates the image recognition processing illustrated in FIG. 4. On the other hand, as a result of the determination at the step S1231, when it is determined that there is not the vanished target (the step S1231: No), the image processing unit 122 terminates the image recognition processing illustrated in FIG. 4.

Again in FIG. 3, in parallel with, after or before the image recognition processing on the telephoto image 111t, the image processing unit 122 executes an image recognition processing for recognizing the target in one portion of the normal image 111w on one portion of the normal image 111w (a step S14). Note that the flow of the image recognition processing for recognizing the target in the normal image 111w is same as the flow of the image recognition processing for recognizing the target in the telephoto image 111t, and thus, the detailed description thereof will be omitted. On the other hand, the image processing unit 122 does not execute the image recognition processing for recognizing the target in remaining portion (in other words, the other portion) of the normal image 111w on the remaining portion of the normal image 111w.

Figure 5A:
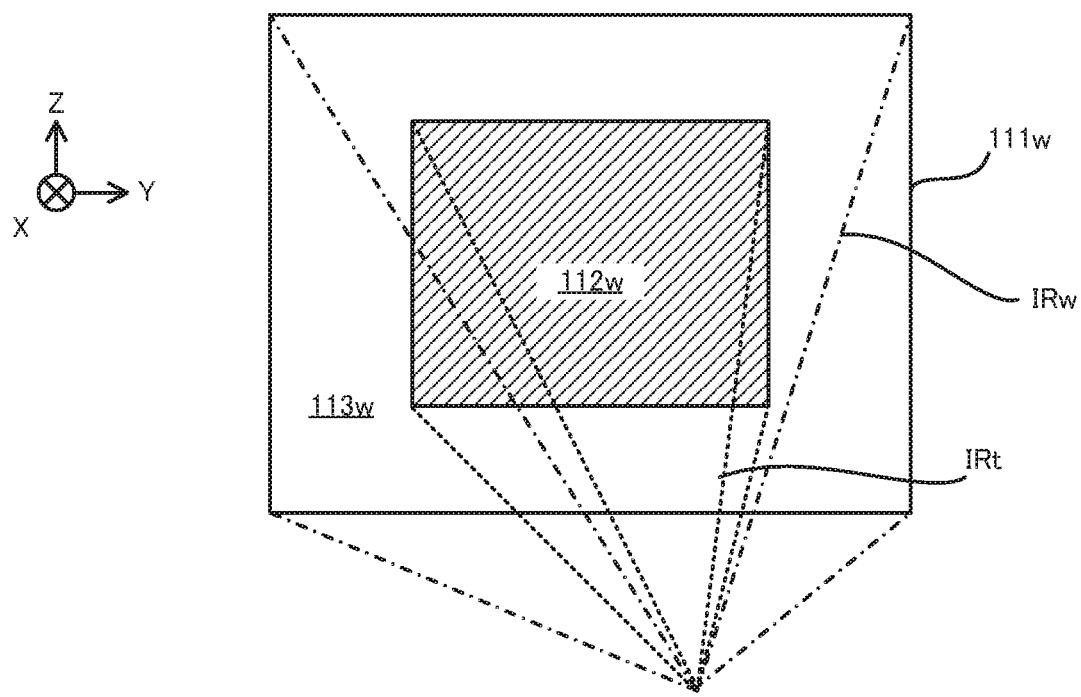
FIG. 5A is a planar view that illustrates a normal image captured by the normal camera and FIG. 5B is a planar view that illustrates a telephoto image captured by the telephoto camera.

Specifically, as described above, the imaging area IRw of the normal camera 11w partially overlaps with the imaging area IRt of the telephoto camera 11t. Specifically, the imaging area IRt of the telephoto camera 11t is included in the imaging area IRw of the normal camera 11w. Thus, as illustrated in FIG. 5A, the normal image 111w includes an overlapped image part 112w including a view that is same as the view in the telephoto image 111t and a non-overlapped image part 113w including a view that is different from the view in the telephoto image 111t. Namely, the normal image 111w includes the overlapped image part 112w including a view in one portion of the imaging area IRw that overlaps with the imaging area IRt and the non-overlapped image part 113w including a view in another one portion of the imaging area IRw that does not overlap with the imaging area IRt (namely, that is unique to the imaging area IRw). Note that FIG. 5A illustrates the telephoto image 111t for the reference.

The target in the overlapped image part 112w must be included in the telephoto image 111t. Thus, the image processing unit 122 is capable of indirectly recognizing the target in the overlapped image part 112w on the basis of a result of the image recognition processing for recognizing the target in the telephoto image 111t without executing the image recognition processing for recognizing the target in the overlapped image part 112w on the overlapped image part 112w. Namely, an accuracy of recognizing the target in the overlapped image part 112w rarely deteriorates even when the image recognition processing for recognizing the target in the overlapped image part 112w is not executed on the overlapped image part 112w. Therefore, in the present embodiment, the image processing unit 122 does not execute the image recognition processing for recognizing the target in the overlapped image part 112w on the overlapped image part 112w of the normal image 111w.

On the other hand, there is a high possibility that the target in the non-overlapped image part 113w is not included in the telephoto image 111t. Thus, there is a high possibility that the target in the non-overlapped image part 113w is not recognizable by the image processing unit 122 on the basis of a result of the image recognition processing for recognizing the target in the telephoto image 111t. Therefore, in the present embodiment, the image processing unit 122 executes the image recognition processing for recognizing the target in the non-overlapped image part 113w on the non-overlapped image part 113w of the normal image 111w (typically, on the whole of the non-overlapped image part 113w).

The above described processing from the step S11 to the step S12 is repeatedly executed every time the telephoto camera 11t images the view on the front of the vehicle 1. Similarly, the above described processing from the step S13 to the step S14 is repeatedly executed every time the normal camera 11w images the view on the front of the vehicle 1.

According to the first target recognition operation, the image processing unit 122 does not necessarily execute the image recognition processing on one portion of the normal image 111w. As a result, the first target recognition operation allows a calculation cost (in other words, a calculation load) of the image recognition processing to be reduced by an amount corresponding to the calculation cost of the image recognition processing executed (actually not executed) on one portion of the normal image 111w, compared to a target recognition operation in a first comparison example by which the image recognition processing is needed to be executed on the whole of the normal image 111w. Namely, the first target recognition operation does not necessarily use the method described in the above described "Technical Problem" (namely, the method that likely deteriorates the accuracy of recognizing the target). Thus, a reduction of the calculation cost of the image recognition processing and a prevention of the deterioration of a recognition accuracy of the image recognition processing are achievable by the first target recognition operation at the same time.

Note that the "reduction of the calculation cost" in the present embodiment may mean a reduction of a calculation amount (in other words, a processing amount) that is necessary to execute the image recognition processing. Therefore, when the calculation amount that is necessary to execute one image recognition processing on the image is smaller than the calculation amount that is necessary to execute another image recognition processing on the same image, the calculation cost of one image recognition processing is reduced from the calculation cost of another image recognition processing (namely, the calculation cost of one image recognition processing is lower than the calculation cost of another image recognition processing). Moreover, the "deterioration of the recognition accuracy" in the present embodiment may mean at least one of an inability of detecting the target itself from the image, an inability of determining what type of target the target is although the target is detectable, determining incorrectly that the target is a second type of target although it must be determined that the target is a first type of target that is different from the second type of target, and an inability of recognizing the target so as to leave a time for a control executed on the basis of a result of recognizing the target.

Note that the image processing unit 122 may recognize the target in at least one of the normal image 111w and the telephoto image 111t by executing the image recognition processing on the whole of the normal image 111w without executing the image recognition processing on the telephoto image 111t, because the view included in the telephoto image 111t is also included in the normal image 111w. However, when the target included in both of the imaging area IRw of the normal camera 11w and the imaging area IRt of the telephoto camera 11t is imaged by both of the normal camera 11w and the telephoto camera 11t, there is a high possibility that this target is included relatively small in the overlapped image part 112w of the normal image 111w and is included relatively largely in the telephoto image 111t due to a difference in the imaging angle and the focal length between the normal image 111w and the telephoto image 111t. Namely, there is a high possibility that this target is included in a relatively small area including a relatively few pixels in the overlapped image part 112w of the normal image 111w and is included in a relatively large area including a relatively many pixels in the telephoto image 111t. Thus, there is a possibility that the accuracy of recognizing the target by the image recognition processing executed on the overlapped image part 112w is lower than the accuracy of recognizing the target by the image recognition processing executed on the telephoto image 111t. Thus, the first target recognition operation by which the image recognition processing is executed on the whole of the telephoto image 111t and the non-overlapped image part 113w of the normal image 111w and the image recognition processing is not executed on the overlapped image part 112w of the normal image 111w is superior to a target recognition operation in a second comparison example by which the image recognition processing is executed on the whole of the normal image 111w and the image recognition processing is not executed on the telephoto image 111t in that the accuracy of recognizing the target improves.

(2-2) Flow of Second Target Recognition Operation

Figure 6:
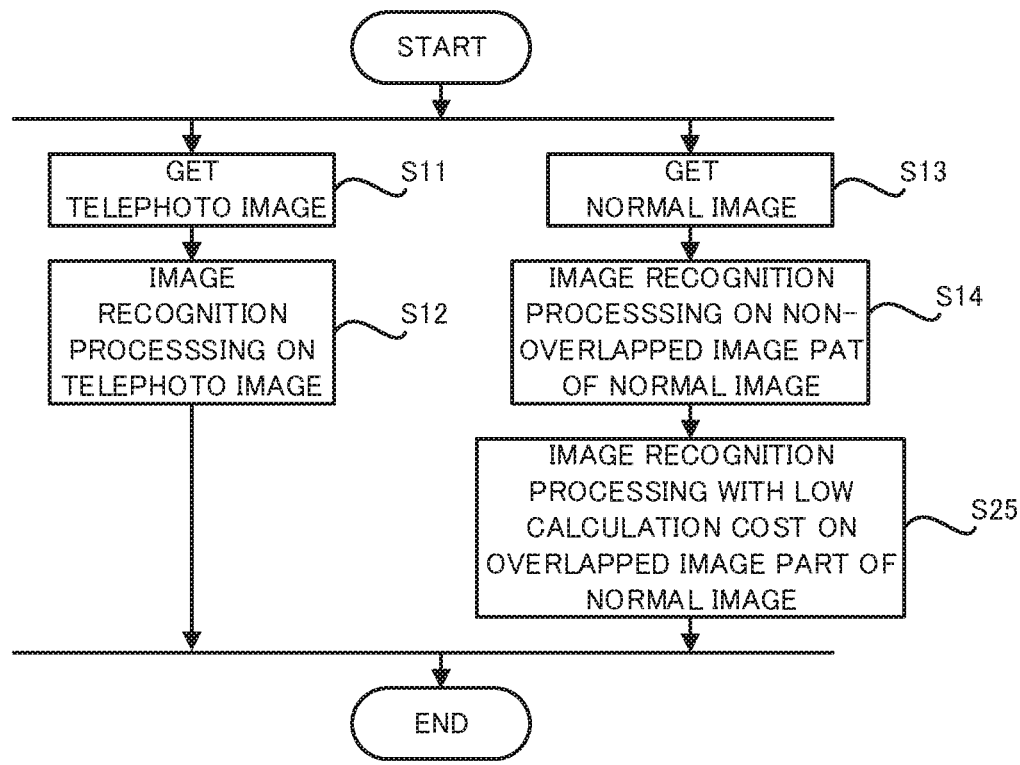
FIG. 6 is a flowchart that illustrates a flow of a second target recognition operation in the present embodiment.

Next, with reference to FIG. 6, a flow of the first target recognition operation will be described. FIG. 6 is a flowchart that illustrates the flow of the second target recognition operation. Note that the detailed description of a process that is same as the process executed in the above described first target recognition operation in FIG. 3 is omitted by assigning the same step number to this process.

Figure 5B:
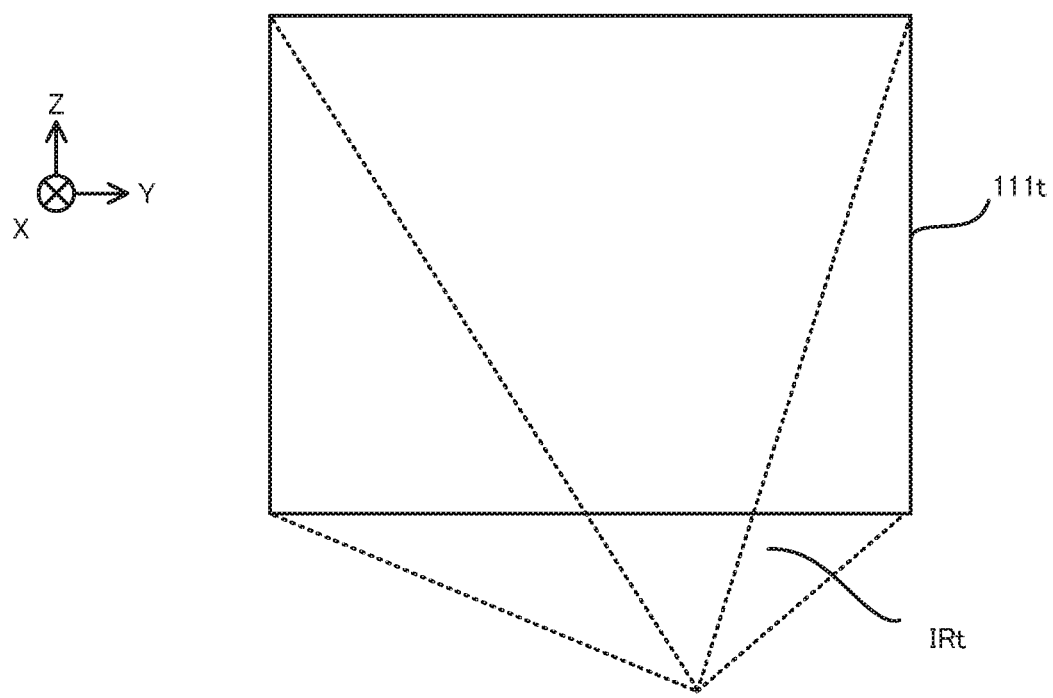

As illustrated in FIG. 5, according to the second target recognition operation, the image receiving device 121 receives the telephoto image 111t from the telephoto camera 11t (the step S11) and executes the image recognition processing on the telephoto image 111t (the step S12), as with the first target recognition operation. Moreover, the image receiving device 121 receives the normal image 111w from the normal camera 11w (the step S13) and executes the image recognition processing on the normal image 111w (the step S14).

Especially in the second target recognition operation, the image processing unit 122 executes the image recognition processing on the overlapped image part 112w of the normal image 111w (a step S25). However, the calculation cost of the image recognition processing executed on the overlapped image part 112w is lower than the calculation cost of the image recognition processing executed on the non-overlapped image part 113w. Namely, the image processing unit 122 executes the image recognition processing with the relatively low calculation cost on the overlapped image part 112w. On the other hand, the image processing unit 122 executes the image recognition processing with the relatively high calculation cost (typically, the image recognition processing executed by the above described first target recognition operation) on the telephoto image 111t and the non-overlapped image part 113w.

In order to reduce the calculation cost, the image processing unit 122 may use the method described in the above described "Technical Problem". For example, the image processing unit 122 may reduce a resolution of the overlapped image part 112w and then execute the image recognition processing on the overlapped image part 112w having the reduced resolution at the step S25. For example, the image processing unit 122 may extract only one portion of the plurality of normal images 111w captured by the normal camera 11w with the first imaging rate for a certain period and then execute the image recognition processing on the overlapped image part 112w of each of the relatively small number of the extracted normal images 111w. Namely, the image processing unit 122 does not necessarily execute the image recognition processing on the overlapped image part 112w of the non-extracted normal image 111w.

According to the second target recognition operation, the image processing unit 122 does not necessarily execute the usual image recognition processing (namely, the image recognition processing executed with the relatively high calculation cost on the telephoto image 111t and the remaining portion of the normal image 111w) on one portion of the normal image 111w. As a result, the second target recognition operation allows the calculation cost of the image recognition processing to be reduced by an amount corresponding to the calculation cost of the usual image recognition processing executed (actually not executed) on one portion of the normal image 111w, compared to a target recognition operation in the first comparison example by which the usual image recognition processing is needed to be executed on the whole of the normal image 111w. On the other hand, as described above, the image processing unit 122 is capable of indirectly recognizing the target in the overlapped image part 112w on the basis of the result of the image recognition processing for recognizing the target in the telephoto image 111t. Thus, the accuracy of recognizing the target in the overlapped image part 112w rarely deteriorates even when the image recognition processing that likely deteriorates the accuracy of recognizing the target is executed (namely, the image recognition processing is executed with the relatively low cost) on the overlapped image part 112w. Thus, the reduction of the calculation cost of the image recognition processing and the prevention of the deterioration of a recognition accuracy of the image recognition processing are achievable by the second target recognition operation at the same time.

Note that the image processing unit 122 may recognize the target in the telephoto image 111t and the overlapped image part 112w on the basis of the result of the image recognition processing executed on the overlapped image part 112w as well as the image recognition processing executed on the telephoto image 111t in the second target recognition operation. As a result, there is a possibility that the accuracy of recognizing the target in the telephoto image 111t and the overlapped image part 112w improves, compared to the case where the result of the image recognition processing executed on the overlapped image part 112w is not used to recognize the target in the telephoto image 111t and the overlapped image part 112w.

(3) Modified Example

Next, a modified example of the target recognition operation will be described. As described above, when the normal image 111w includes the overlapped image part 112w and the non-overlapped image part 113w, there is a possibility that the normal image 111w includes the target that is located on a border between the overlapped image part 112w and the non-overlapped image part 113w. In the following description, this target is referred to as a "specific target P" for the purpose of the description.

Figures 7A, 7B:
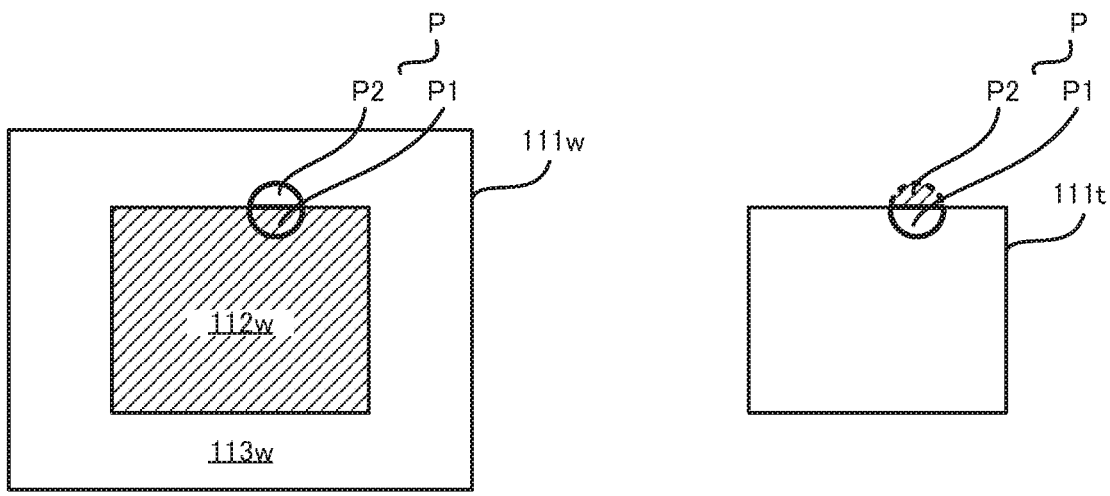
FIG. 7A is a planar view that illustrates, on the normal image, a specific target located on a border between an overlapped image part and a non-overlapped image part
FIG. 7B is a planar view that illustrates, on the normal image, the specific target located on the border between the overlapped image part and the non-overlapped image part.

In this case, as illustrated in FIG. 7A, a first target part P1 of the specific target P is included in the overlapped image part 112w and a second target part P2 of the specific target P other than the first target part P1 is included in the non-overlapped image part 113w. As a result, according to the above described first target recognition operation, the first target part P1 is not detectable by the image processing unit 122, because the image recognition processing is not executed on the overlapped image part 112w. As a result, there is a possibility that the specific target P including the first target part P1 is not recognizable as a whole by the image processing part 122 on the basis of the result of the image recognition processing executed on the normal image 111w. Similarly, according to the above described second target recognition operation, there is a possibility that the accuracy of recognizing the specific target P including the first target part P1 deteriorates, because the image recognition processing that likely deteriorates the recognition accuracy is executed on the overlapped image part 112w. As a result, there is a possibility that the specific target P including the first target part P1 is not recognizable as a whole by the image processing part 122 on the basis of the result of the image recognition processing executed on the normal image 111w. On the other hand, as illustrated in FIG. 7B, regarding the telephoto image 111t, the first target part P1 of the specific target P is included in the telephoto image 111t and the second target part P2 of the specific target P is not included in the telephoto image 111t. As a result, according to the above described first target recognition operation or the second target recognition operation, there is a possibility that the specific target P including the second target part P2 is not recognizable as a whole by the image processing part 122 on the basis of the result of the image recognition processing executed on the telephoto image 111t.

Thus, in the modified example, the image processing unit 122 changes an aspect of the image recognition processing executed on the normal image 111w so as to recognize the specific target P (namely, so as to determine what type of the target the specific target P is) more easily, compared to the case where there is not the specific target P, when there is the specific target P locating on the border between the overlapped image part 112w and the non-overlapped image part 113w. Specifically, in the modified example, the image processing unit 122 executes, as the processing executed on the telephoto image 111t, a processing illustrated in FIG. 8 instead of the processing at the step S12 in each of FIG. 3 and FIG. 6 in order to allow the specific target P to be recognizable more easily. Moreover, the image processing unit 122 executes, as the processing executed on the normal image 111w, a processing illustrated in FIG. 9 instead of the processing at the step S14 in FIG. 3 or the processing from the step S14 to the step S25 in FIG. 6 in order to allow the specific target P to be recognizable more easily. Next, with reference to FIG. 8 and FIG. 9, the processing executed on the telephoto image 111t and the normal image 111w in the modified example will be described.

Figure 8:
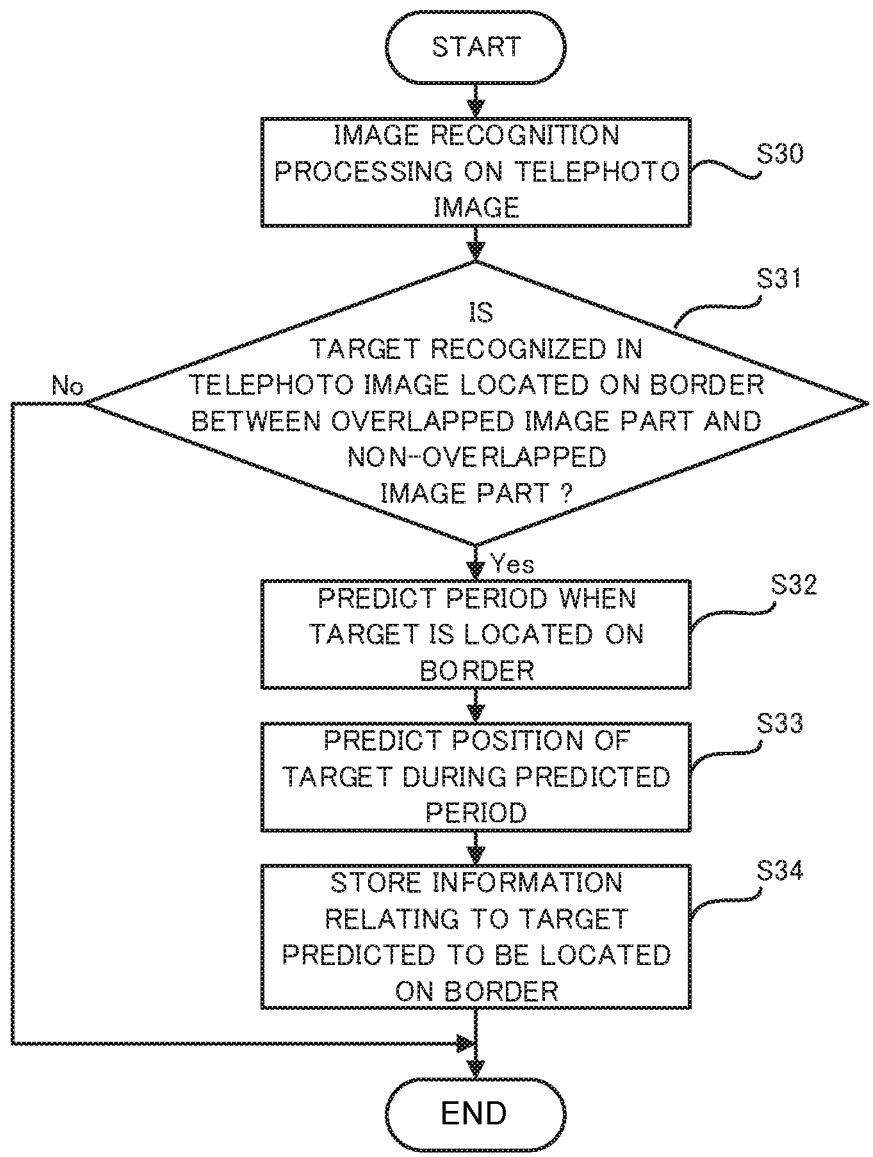
FIG. 8 is a flowchart that illustrates a flow of a processing for the telephoto image in a modified example.

Firstly, the processing executed on the telephoto image 111t in the modified example will be described. As illustrated in FIG. 8, firstly, the image processing unit 122 executes the image recognition processing on the telephoto image 111t (a step S30). Note that the image recognition processing at the step S30 is same as the image recognition processing at the step S12 in FIG. 3. As a result, the image processing unit 122 calculates the moving direction and the moving velocity of the target in the telephoto image 111*t*.

Then, the image processing unit 122 predicts in advance whether or not at least one of the target recognized by the image recognition processing is located on the border between the overlapped image part 112*w* and the non-overlapped image part 113*w* in the near future (for example, before a predetermined time elapses from now) on the basis the result of the image recognition processing at the step S30 (a step S31). Namely, the image processing unit 122 determines whether or not the telephoto image 111*t* includes the target that is predicted to be the specific target P in the near future. Specifically, the image processing unit 122 predicts the future position of the target on the basis of the moving direction and the moving velocity of the target recognized by the image recognition processing and determines whether or not the target located on the predicted position is located on the border between the overlapped image part 112*w* and the non-overlapped image part 113*w*.

As a result of the determination at the step S31, when it is determined that there is not the target that is predicted to be the specific target P in the near future (the step S31: No), the image processing unit 122 terminates the processing illustrated in FIG. 8. On the other hand, as a result of the determination at the step S31, when it is determined that there is the target that is predicted to be the specific target P in the near future (the step S31: Yes), the image processing unit 122 predicts a period when the target is located on the border between the overlapped image part 112*w* and the non-overlapped image part 113*w* (namely, a period when the target is the specific target P) on the basis of the result of the image recognition processing at the step S30 (especially, the moving direction and the moving velocity of the target) (a step S32). Moreover, the image processing unit 122 predicts the position of the target during the period predicted at the step S32 (namely, a position at which the target is located on the border between the overlapped image part 112*w* and the non-overlapped image part 113*w*) (a step S33). Then, the image processing unit 122 stores an information relating to the target that is predicted to be the specific target P in the future (including an information relating to the period predicted at the step S32 and an information relating to the position predicted at the step S33) (a step S34).

Figure 9:
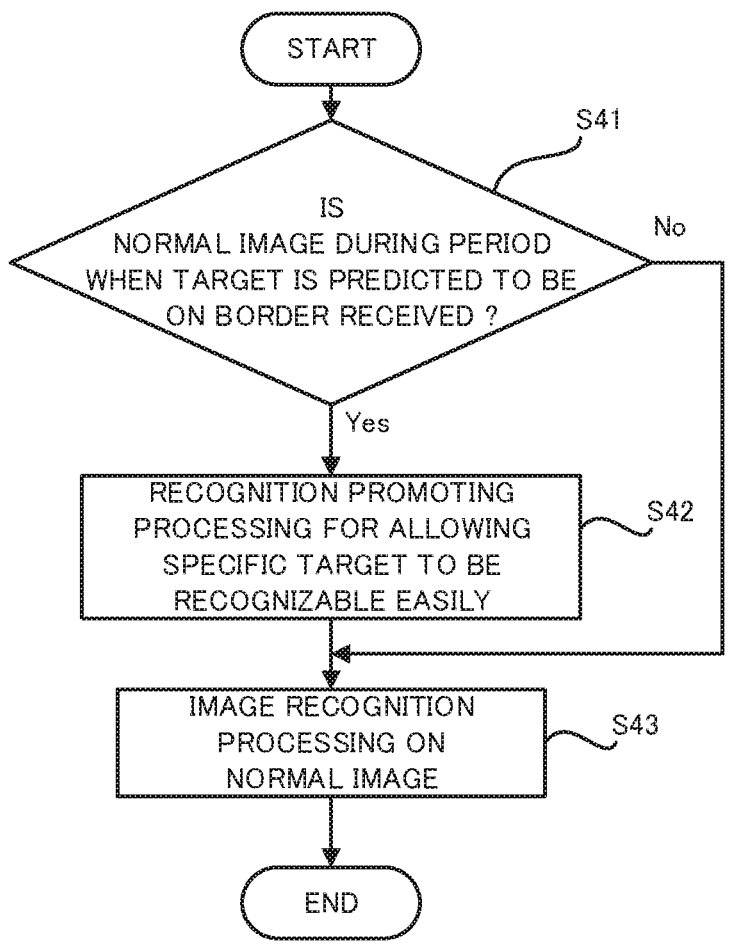
FIG. 9 is a flowchart that illustrates a flow of a processing for the normal image in a modified example.

Then, the processing executed on the normal image 111*w* in the modified example will be described. As illustrated in FIG. 9, firstly, the image processing unit 122 determines whether or not to the image receiving unit 121 already receives the normal image 111*w* captured by the normal camera 11*w* during the period predicted at the step S32 in FIG. 8 (a step S41). It can be said that the image processing unit 122 determines whether or not the image receiving unit 121 already receives the normal image 111*w* in which the specific target P is predicted to be included at the step S41, because it is predicted that the target in the telephoto image 111*t* is located on the border between the overlapped image part 112*w* and the non-overlapped image part 113*w* during the period predicted at the step S32.

As a result of the determination at the step S41, when it is determined that the image receiving unit 121 already receives the normal image 111*w* captured by the normal camera 11*w* during the period predicted at the step S32 in FIG. 8 (the step S41: Yes), it is estimated that the specific target P is included in the received normal image 111*w*. In this case, the image processing unit 122 executes a recognition promoting processing (a step S42). The recognition promoting processing is a processing for allowing the specific target P in the normal image 111*w* to be recognizable more easily by the image recognition processing executed on the normal image 111*w*. The recognition promoting processing is a processing for changing the image recognition processing on the normal image 111*w* so that the specific target P in the normal image 111*w* is recognizable more easily by the image recognition processing executed on the normal image 111*w*.

Figure 10:
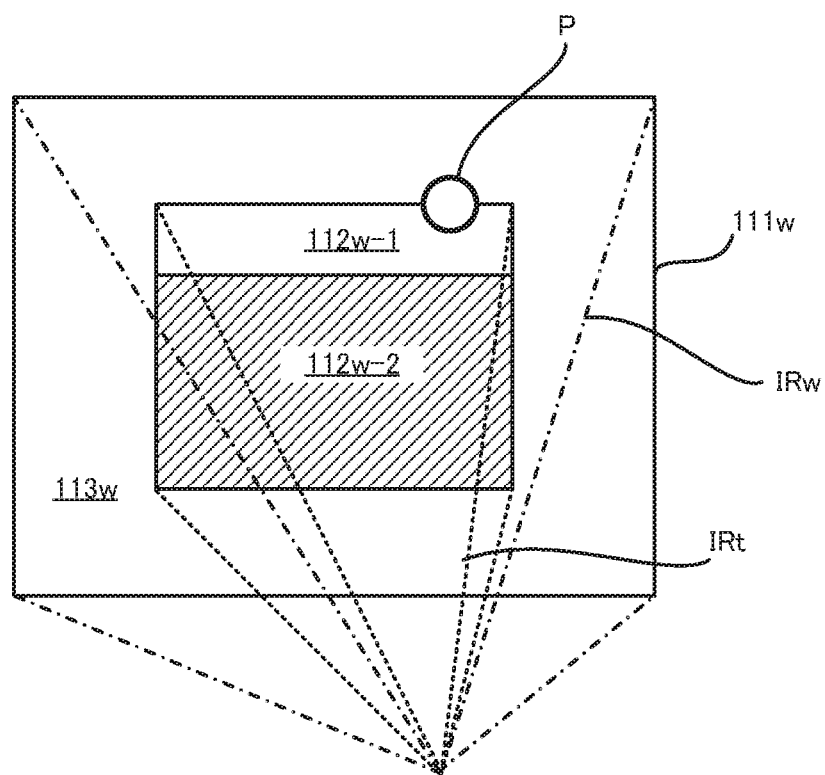
FIG. 10 is a planar view that illustrates an aspect in which a first recognition promoting processing changes an area on which the normal image recognition processing is executed.

The recognition promoting processing may include a first recognition promoting processing for changing an image part on which the usual image recognition processing (specifically, the image recognition processing that is same as the image recognition processing executed on the telephoto image 111*t*) is executed. Specifically, as described above, the usual image recognition processing is executed on the non-overlapped image part 113*w* of the normal image 111*w*, and the image recognition processing is not executed or the image recognition processing is executed with the relatively low calculation cost on the overlapped image part 112*w* of the normal image 111*w*. The first recognition promoting processing is a processing for increasing the image part on which the usual image recognition processing is executed when the specific target P is included, compared to the case where the specific target P is not included. Typically, as illustrated in FIG. 10, the first recognition promoting processing is a processing for increasing the image part on which the usual image recognition processing is executed so that the increased image part includes an image part 112*w*-1 that is one portion of the overlapped image part 112*w* and that includes the specific target P. Namely, the first recognition promoting processing is a processing for increasing the image part on which the usual image recognition processing is executed so that the whole of the image part including the specific target P is included in the image part on which the usual image recognition processing is executed. As a result, the specific target P is recognizable more easily (namely, recognizable appropriately) by the image processing unit 122, because the usual image recognition processing is executed on the whole of the specific target P. Note that the image recognition processing may not be executed or the image recognition processing may be executed with the relatively low calculation cost on a remaining image part 112*w*-2 of the overlapped image part 111*w* other than the image part 112*w*-1 as always.

When the template matching method is used as the method of recognizing the target as described above, the recognition promoting processing may include a second recognition promoting processing for changing a threshold value that is compared with the similarity in order to recognize the target on the basis of the similarity between the template and the target. Specifically, the template matching method determines that the target is the target having the type corresponding to the template usually when the similarity between the template and the target is larger than the threshold value (namely, there is a high possibility that the target is similar to the template). Thus, it is determined more easily that the target is the target having the type corresponding to the template, as the threshold value becomes smaller. Namely, the target is recognizable more easily as the threshold value become smaller. Thus, typically, the second recognition promoting processing is a processing for decreasing the threshold value when the specific target P is included, compared to the case where the specific target P is not included. As a result, the specific target P is recognizable more easily (namely, recognizable appropriately) by the image processing unit 122, When the method using the neural network is used as the method of recognizing the target as described above, the recognition promoting processing may include a third recognition promoting processing for changing a weight coefficient of the neural network. Specifically, when the third recognition promoting processing is used, the image processing unit 122 prepares a first weight coefficient that is used to recognize the target when the specific target P is not included and a second weight coefficient that is used to recognize the target (especially, the specific target P) when the specific target P is included. The first weight coefficient is obtained relatively easily by making the neural network learn by using the image that does not include the specific target P. The second weight coefficient is obtained relatively easily by making the neural network learn by using the image that includes the specific target P. In this case, typically, the third recognition promoting processing is a processing for selecting the first weight coefficient as the weight coefficient used by the neural network when the specific target P is not included and selecting the second weight coefficient as the weight coefficient used by the neural network when the specific target P is included. As a result, the specific target P is recognizable more easily (namely, recognizable appropriately) by the image processing unit 122.

After this recognition promoting processing is executed, the image processing unit 122 executes the image recognition processing on the normal image 111$w$ (a step S43). Note that the image recognition processing at the step S43 is same as the image recognition processing at the step S14 in FIG. 3 or from the step S14 to the step S25 in FIG. 6 except a changed processing due to the above described recognition promoting processing.

On the other hand, as a result of the determination at the step S41, when it is determined that the image receiving unit 121 does not yet receive the normal image 111$w$ captured by the normal camera 11$w$ during the period predicted at the step S32 in FIG. 8 (the step S41: No), it is estimated that the specific target P is not included in the received normal image 111$w$. In this case, the image processing unit 122 may not execute the recognition promoting processing. Moreover, when it is determined that the image receiving unit 121 does not yet receives the normal image 111$w$ captured by the normal camera 11$w$ during the period predicted at the step S32 in FIG. 8 under the situation where the recognition promoting processing is already executed (namely, the aspect of the image recognition processing executed on the normal image 111$w$ is already changed), the image processing unit 122 terminates the recognition promoting processing. Namely, the image processing unit 122 brings the changed aspect of the image recognition processing executed on the normal image 111$w$ to an original aspect. For example, the image processing unit 122 brings the image part on which the usual image recognition processing is executed, the threshold value for the template matching method and/or the weight coefficient of the neural network to the original one. Then, the image processing unit 122 executes the image recognition processing on the normal image 111$w$ (the step S43).

As described above, in the modified example, the image processing unit 122 is capable of appropriately recognizing the specific target P, even when there is the specific target P that may be difficult to be recognized if no measurement is done.

Note that the image processing unit 122 determines on the basis of the result of the image recognition processing executed on the telephoto image 111$t$ whether or not there is the target that is predicted to be the specific target P in the near future in the above described description. However, the image processing unit 122 may determine on the basis of the result of the image recognition processing executed on the normal image 111$w$ whether or not there is the target that is predicted to be the specific target P in the near future In the above described description, the image processing unit 122 predicts in advance whether or not at least one target is located on the border between the overlapped image part 112$w$ and the non-overlapped image part 113$w$. However, the image processing unit 122 may determine whether or not at least one target is actually located on the border between the overlapped image part 112$w$ and the non-overlapped image part 113$w$. When it is determined that at least one target is actually located on the border between the overlapped image part 112$w$ and the non-overlapped image part 113$w$, the recognition promoting processing may be executed.

(4) Additional Statement

Relating to the above described embodiment, following additional statements will be disclosed.

(4-1) Additional Statement 1

An image processing apparatus according to the additional statement 1 is an image processing apparatus having: a receiving device that is configured to receive a first image obtained by a first imaging device imaging a first imaging area and a second image obtained by a second imaging device imaging a second imaging area, a focal length of the second imaging device being longer than a focal length of the first imaging device, the second imaging area partially overlapping with the first imaging area; and a processing device that is configured to execute, on each of the first image and the second image, an image recognition processing for recognizing a target in at least one of the first image and the second image, the processing device being configured to execute the image recognition processing with a first calculation cost on a non-overlapped image part of the first image and to execute the image recognition processing with a second calculation cost that is lower than the first calculation cost on a overlapped image part of the first image when the processing device executes the image recognition processing on the first image, the non-overlapped image part including a non-overlapped area at which the first imaging area does not overlap with the second imaging area, the overlapped image part including a overlapped area at which the first imaging area overlaps with the second imaging area.

An image processing apparatus according to the additional statement 1 may be an image processing apparatus having a controller, the controller being programmed to: receive a first image obtained by a first imager imaging a first imaging area and a second image obtained by a second imager imaging a second imaging area, a focal length of the second imager being longer than a focal length of the first imager, the second imaging area partially overlapping with the first imaging area; and execute, on at least one portion of the first image and the second image, an image recognition processing for recognizing a target in at least one of the first image and the second image, the controller being programmed to execute the image recognition processing on a non-overlapped image part of the first image without executing the image recognition processing on a overlapped image part of the first image when the image recognition processing is executed on the first image, the non-overlapped image part including a non-overlapped area at which the first imaging area does not overlap with the second imaging area, the overlapped image part including a overlapped area at which the first imaging area overlaps with the second imaging area.

In the image processing apparatus according to the additional statement 1, the processing device is configured to execute the image recognition processing on the non-overlapped image part of the first image and not to execute the image recognition processing on the overlapped image part of the first image. As a result, a calculation cost of the image recognition processing executed by the image processing apparatus according to the additional statement 1 is lower than the calculation cost of the image recognition processing executed by an image processing apparatus in a comparison example that is configured to execute the image recognition processing on the whole of the first image.

On the other hand, there is a possibility that an accuracy of recognizing the target in the overlapped image part of the first image deteriorates, because the image recognition processing is not executed on the overlapped image part. However, the target in the overlapped image part of the first image is recognizable by the image recognition processing executed on the second image, because the target in the overlapped image part of the first image is included in the second image. Thus, the accuracy of recognizing the target in the overlapped image part rarely deteriorates even when the image recognition processing is not executed on the overlapped image part.

Thus, a reduction of the calculation cost of the image recognition processing and a prevention of the deterioration of a recognition accuracy of the image recognition processing are achievable by the image processing apparatus according to the additional statement 1 at the same time.

(4-2) Additional Statement 2

An image processing apparatus according to the additional statement 2 is an image processing apparatus having: a receiving device that is configured to receive a first image obtained by a first imaging device imaging a first imaging area and a second image obtained by a second imaging device imaging a second imaging area, a focal length of the second imaging device being longer than a focal length of the first imaging device, the second imaging area partially overlapping with the first imaging area; and a processing device that is configured to execute, on each of the first image and the second image, an image recognition processing for recognizing a target in at least one of the first image and the second image, the processing device being configured to execute the image recognition processing with a first calculation cost on a non-overlapped image part of the first image and to execute the image recognition processing with a second calculation cost that is lower than the first calculation cost on a overlapped image part of the first image when the processing device executes the image recognition processing on the first image, the non-overlapped image part including a non-overlapped area at which the first imaging area does not overlap with the second imaging area, the overlapped image part including a overlapped area at which the first imaging area overlaps with the second imaging area.

An image processing apparatus according to the additional statement 2 may be an image processing apparatus having a controller, the controller being programmed to: receive a first image obtained by a first imager imaging a first imaging area and a second image obtained by a second imager imaging a second imaging area, a focal length of the second imager being longer than a focal length of the first imager, the second imaging area partially overlapping with the first imaging area; and execute, on each of the first image and the second image, an image recognition processing for recognizing a target in at least one of the first image and the second image, the controller being programmed to execute the image recognition processing with a first calculation cost on a non-overlapped image part of the first image and to execute the image recognition processing with a second calculation cost that is lower than the first calculation cost on a overlapped image part of the first image when the image recognition processing is executed on the first image, the non-overlapped image part including a non-overlapped area at which the first imaging area does not overlap with the second imaging area, the overlapped image part including a overlapped area at which the first imaging area overlaps with the second imaging area.

In the image processing apparatus according to the additional statement 2, the processing device is configured to execute the image recognition processing with a relatively low calculation cost on the overlapped image part of the first image and to execute the image recognition processing with a relatively high calculation cost on the non-overlapped image part of the first image. As a result, the calculation cost of the image recognition processing executed by the image processing apparatus according to the additional statement 2 is lower than the calculation cost of the image recognition processing executed by an image processing apparatus in a comparison example that is configured to execute the image recognition processing with a relatively high calculation cost on the whole of the first image.

On the other hand, there is a possibility that an accuracy of recognizing the target in the overlapped image part of the first image deteriorates, because the image recognition processing with the relatively low calculation cost is executed on the overlapped image part. However, as described above, the target in the overlapped image part of the first image is recognizable by the image recognition processing executed on the second image. Thus, the accuracy of recognizing the target in the overlapped image part rarely deteriorates even when the calculation cost of the image recognition processing executed on the overlapped image part is relatively low.

Thus, the reduction of the calculation cost of the image recognition processing and the prevention of the deterioration of the recognition accuracy of the image recognition processing are achievable by the image processing apparatus according to the additional statement 2 at the same time, as with the image processing apparatus according to the additional statement 1.

(4-3) Additional Statement 3

An image processing apparatus according to the additional statement 3 is an image processing apparatus having: a receiving device that is configured to receive a first image obtained by a first imaging device imaging a first imaging area and a second image obtained by a second imaging device imaging a second imaging area, a focal length of the second imaging device being longer than a focal length of the first imaging device, the second imaging area partially overlapping with the first imaging area; and a processing device that is configured to execute, on each of the first image and the second image, an image recognition processing for recognizing a target in at least one of the first image and the second image, the processing device being configured to execute, as the image recognition processing, a first image recognition processing for recognizing the target in a non-overlapped image part of the first image on each of the plurality of first images and to execute, as the image recognition processing, a second image recognition processing for recognizing the target in an overlapped image part of the first image on one portion of the plurality of first images without executing the second image recognition processing on another one portion of the plurality of first images, when the processing device executes the image recognition processing on a plurality of first images, the non-overlapped image part including a non-overlapped area at which the first imaging area does not overlap with the second imaging area, the overlapped image part including a overlapped area at which the first imaging area overlaps with the second imaging area.

An image processing apparatus according to the additional statement 3 may be an image processing apparatus having a controller, the controller being programmed to: receive a first image obtained by a first imager imaging a first imaging area and a second image obtained by a second imager imaging a second imaging area, a focal length of the second imager being longer than a focal length of the first imager, the second imaging area partially overlapping with the first imaging area; and execute, on each of the first image and the second image, an image recognition processing for recognizing a target in at least one of the first image and the second image, the controller being programmed to execute, as the image recognition processing, a first image recognition processing for recognizing the target in a non-overlapped image part of the first image on each of the plurality of first images and to execute, as the image recognition processing, a second image recognition processing for recognizing the target in an overlapped image part of the first image on one portion of the plurality of first images without executing the second image recognition processing on another one portion of the plurality of first images, when the image recognition processing is executed on a plurality of first images, the non-overlapped image part including a non-overlapped area at which the first imaging area does not overlap with the second imaging area, the overlapped image part including a overlapped area at which the first imaging area overlaps with the second imaging area.

In the image processing apparatus according to the additional statement 3, the processing device does not necessarily execute the second image recognition processing for recognizing the target in the overlapped image part on one portion of the plurality of first images. As a result, the calculation cost of the image recognition processing executed by the image processing apparatus according to the additional statement 3 is lower than the calculation cost of the image recognition processing executed by an image processing apparatus in a comparison example that is configured to execute the second image recognition processing for recognizing the target in the overlapped image part on all of the plurality of first images.

On the other hand, there is a possibility that an accuracy of recognizing the target in the overlapped image part of the first image deteriorates, because the second image recognition processing for recognizing the target in the overlapped image part is not executed on one portion of the plurality of the first images. However, as described above, the target in the overlapped image part of the first image is recognizable by the image recognition processing executed on the second image. Thus, the accuracy of recognizing the target in the overlapped image part rarely deteriorates even when the second image recognition processing for recognizing the target in the overlapped image part is not executed on one portion of the plurality of the first images Thus, the reduction of the calculation cost of the image recognition processing and the prevention of the deterioration of the recognition accuracy of the image recognition processing are achievable by the image processing apparatus according to the additional statement 3 at the same time, as with the image processing apparatus according to the additional statement 1 or 2.

(4-4) Additional Statement 4

An image processing apparatus according to the additional statement 4 is the image processing apparatus according to any one of the additional statements 1 to 3, wherein the processing device is configured to (i) determine whether or not there is a specific target that is the target in the first image and that is located on a border between the overlapped image part and the non-overlapped image part and (ii) execute the image recognition processing on the first image so that the specific target is recognized more easily compared to the case where it is determined that there is not the specific target, when it is determined that there is the specific target.

Alternatively, an image processing apparatus according to the additional statement 4 may be the image processing apparatus according to any one of the additional statements 1 to 3, wherein the controller being programmed to (i) determine whether or not there is a specific target that is the target in the first image and that is located on a border between the overlapped image part and the non-overlapped image part and (ii) execute the image recognition processing on the first image so that the specific target is recognized more easily compared to the case where it is determined that there is not the specific target, when it is determined that there is the specific target.

When there is the specific target in the first image that is located on the border between the overlapped image part and the non-overlapped image part, one portion of the specific target is included in the non-overlapped image part on which the image recognition processing is executed or the image recognition processing with the relatively high calculation cost is executed and the other portion of the specific target is included in the overlapped image part on which the image recognition processing is not executed or the image recognition processing with the relatively low calculation cost is executed. Thus, if no measurement is done, there is a possibility that the specific target is difficult to be recognized by the image recognition processing executed on the first image, because the image recognition processing is not executed or the image recognition processing with the relatively low calculation cost is executed on the overlapped image part. Moreover, regarding the second image, only one portion of the specific target is included in the second image and the other portion of the specific target is not included in the second image. Thus, if no measurement is done, there is a possibility that the specific target is difficult to be recognized by the image recognition processing executed on the second image, because the image recognition processing is executed on only one portion of the specific target.

Thus, the image processing apparatus according to the additional statement 4 executes the image recognition processing on the first image so that the specific target is recognized more easily compared to the case where there is not the specific target, when there is the specific target. Therefore, the image processing apparatus according to the additional statement 4 is capable of recognizing the specific target, even when there is the specific target that may be difficult to be recognized if no measurement is done.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2018-135056, filed on Jul. 18, 2018, the entire contents of which are incorporated herein by reference. In addition, the entire contents of the above described Patent Literatures 1 and 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image processing apparatus, which involve such changes, are also intended to be within the technical scope of the present invention.

REFERENCE SIGNS LIST 1 vehicle
11w normal camera
11t telephoto camera
111w normal image
112w overlapped image part
113w non-overlapped image part
111t telephoto image
12 ECU
121 image receiving unit
122 image processing unit
IRw, IRt imaging area
θhw, θht horizontal imaging angle
θvw, θvt vertical imaging angle
P specific target

The invention claimed is:

1. An image processing apparatus comprising a controller, the controller being programmed to:

receive a first image obtained by a first imager imaging a first imaging area and a second image obtained by a second imager imaging a second imaging area, a focal length of the second imager being longer than a focal length of the first imager, the second imaging area partially overlapping with the first imaging area; and execute, on at least one portion of the first image and the second image, an image recognition processing for recognizing a target in at least one of the first image and the second image, the controller being programmed to execute the image recognition processing on a non-overlapped image part of the first image without executing the image recognition processing on a overlapped image part of the first image when the image recognition processing is executed on the first image, the non-overlapped image part including a non-overlapped area at which the first imaging area does not overlap with the second imaging area, the overlapped image part including a overlapped area at which the first imaging area overlaps with the second imaging area.

2. The image processing apparatus according to claim 1, wherein the controller being programmed to (i) determine whether or not there is a specific target that is the target in the first image and that is located on a border between the overlapped image part and the non-overlapped image part and (ii) execute the image recognition processing on the first image such that the controller predicts a future position of the specific target and stores information on the prediction for future image processing, when it is determined that there is the specific target.

* * * * *